US012777344B2

(12) United States Patent
Schelstraete et al.

(10) Patent No.: US 12,777,344 B2
(45) Date of Patent: Oct. 27, 2026

(54) MULTI-LINK DEVICE OPERATION

(71) Applicant: MaxLinear, Inc., Carlsbad, CA (US)

(72) Inventors: Sigurd Schelstraete, Menlo Park, CA (US); Marcos Martínez Vázquez, Barcelona (ES); Iñaki Val Beitia, Vitoria (ES)

(73) Assignee: MaxLinear, Inc., Carlsbad, CA (US)

( * ) Notice: Subject to any disclaimer, the term of this patent is extended or adjusted under 35 U.S.C. 154(b) by 277 days.

(21) Appl. No.: 18/602,001

(22) Filed: Mar. 11, 2024

(65) Prior Publication Data

US 2024/0306013 A1 Sep. 12, 2024

Related U.S. Application Data

(60) Provisional application No. 63/489,688, filed on Mar. 10, 2023.

(51) Int. Cl.

| | |
|---|---|
| ***H04W 24/02*** | (2009.01) |
| ***H04W 24/06*** | (2009.01) |
| ***H04W 80/02*** | (2009.01) |
| ***H04W 84/12*** | (2009.01) |

(52) U.S. Cl.

CPC ........... *H04W 24/02* (2013.01); *H04W 24/06* (2013.01); *H04W 80/02* (2013.01); *H04W 84/12* (2013.01)

(58) Field of Classification Search

None

See application file for complete search history.

(56) References Cited

U.S. PATENT DOCUMENTS

| | | | | |
|---|---|---|---|---|
| 2016/0057055 | A1* | 2/2016 | Barrett .................. | H04W 72/20 370/329 |
| 2018/0184428 | A1 | 6/2018 | Cariou et al. | |
| 2021/0126947 | A1 | 4/2021 | Wang | |
| 2021/0160958 | A1 | 5/2021 | Patil et al. | |
| 2022/0287122 | A1 | 9/2022 | Wang et al. | |
| 2022/0303356 | A1 | 9/2022 | Cariou et al. | |
| 2024/0291763 | A1* | 8/2024 | Viger ...................... | H04L 47/24 |
| 2025/0351179 | A1* | 11/2025 | Zhou .................... | H04B 7/0626 |
| 2026/0006667 | A1* | 1/2026 | Jang ...................... | H04W 76/15 |

OTHER PUBLICATIONS

International Search Report and Written Opinion of PCT Application No. PCT/US2024/019475 mailed Jun. 24, 2024, 11 pgs.

* cited by examiner

*Primary Examiner* — Saad Khawar

(74) *Attorney, Agent, or Firm* — Buchalter; Jason W. Croft

(57) ABSTRACT

Embodiments are described herein that involve various configurations of UMAC and LMACs in a multi-link operations architecture. Some of these embodiments allow for multi-link operations using multiple different kinds of wired and wireless connections. The embodiments, also describe configurations that allow for the physical separation of UMAC and LMAC components.

16 Claims, 6 Drawing Sheets

MULTI-LINK DEVICE OPERATION

CROSS-REFERENCE TO RELATED APPLICATIONS

This application claims priority to U.S. Provisional Patent Application No. 63/489,688 filed on Mar. 10, 2023 and entitled "MULTI-LINK DEVICE OPERATION", which is incorporated by reference in its entirety.

TECHNICAL FIELD

This disclosure relates to wireless communication, and more specifically, to Multi-Link Device (MLD) Operation.

BACKGROUND

Institute of Electrical and Electronics Engineers (IEEE) 802.11 standards include protocols for implementing wireless local area network (WLAN) communications, including Wi-Fi. In the IEEE standards, the media access control (MAC) layer provides a control abstraction of a physical (PHY) layer such that the complexities of physical link control are invisible to upper layers of a network stack.

The subject matter claimed in the present disclosure is not limited to implementations that solve any disadvantages or that operate only in environments such as those described above. Rather, this background is only provided to illustrate one example technology area where some embodiments described in the present disclosure may be practiced.

SUMMARY

This paper describes various embodiments that relate to multi-link device operation. In some embodiments, various upper MAC (UMAC) and lower MAC (LMAC) components or devices can be separated to achieve various improvements.

A multi-link device (MLD) architecture is described and includes the following: a common memory; an Upper MAC (UMAC) device; and multiple of Lower MAC (LMAC) devices physically separated from each other and from the UMAC device, where the UMAC device and the multiple LMAC devices have access to the common memory.

Another MLD architecture is disclosed and includes an Upper MAC (UMAC); and multiple Lower MACs (LMAC) in communication with the UMAC. The multiple LMACs include a first LMAC configured to manage a Wi-Fi transceiver; and a second LMAC configured to manage a non-Wi-Fi link.

BRIEF DESCRIPTION OF THE DRAWINGS

Example embodiments will be described and explained with additional specificity and detail through the use of the accompanying drawings in which.

DETAILED DESCRIPTION

Prior to IEEE 802.11be (Wi-Fi 7), Wi-Fi networks were set up on a wireless channel that can be between 20 and 160 MHz wide. Transmissions could use all or part of the bandwidth of the channel. When implementing multi-basic service set (BSS), a single device can set up more than one of these networks, but all of these networks are effectively independent. Functionally, a conventional multi-BSS device is equivalent to multiple independent access points (APs) housed in a single device. As the term is used herein, Wi-Fi is generally used as an example type of wireless communication. It should be appreciated that where the term Wi-Fi is used in this paper, it could be substituted for "wireless" or any other type of wireless communication, as the present disclosure applies to all types of communications and related protocols and not just to Wi-Fi.

In multi-link operation (MLO) as presently disclosed, a single device uses multiple links (e.g., wireless channels), but the traffic streams going over the multiple links can be aggregated at a higher layer. A multi-link device (MLD) has one traffic interface and distributes this traffic over two or more links. Functionally, the MLD acts as a single AP towards the higher layers, but includes of multiple affiliated APs operating on different channels towards the lower layers.

Figure 1:
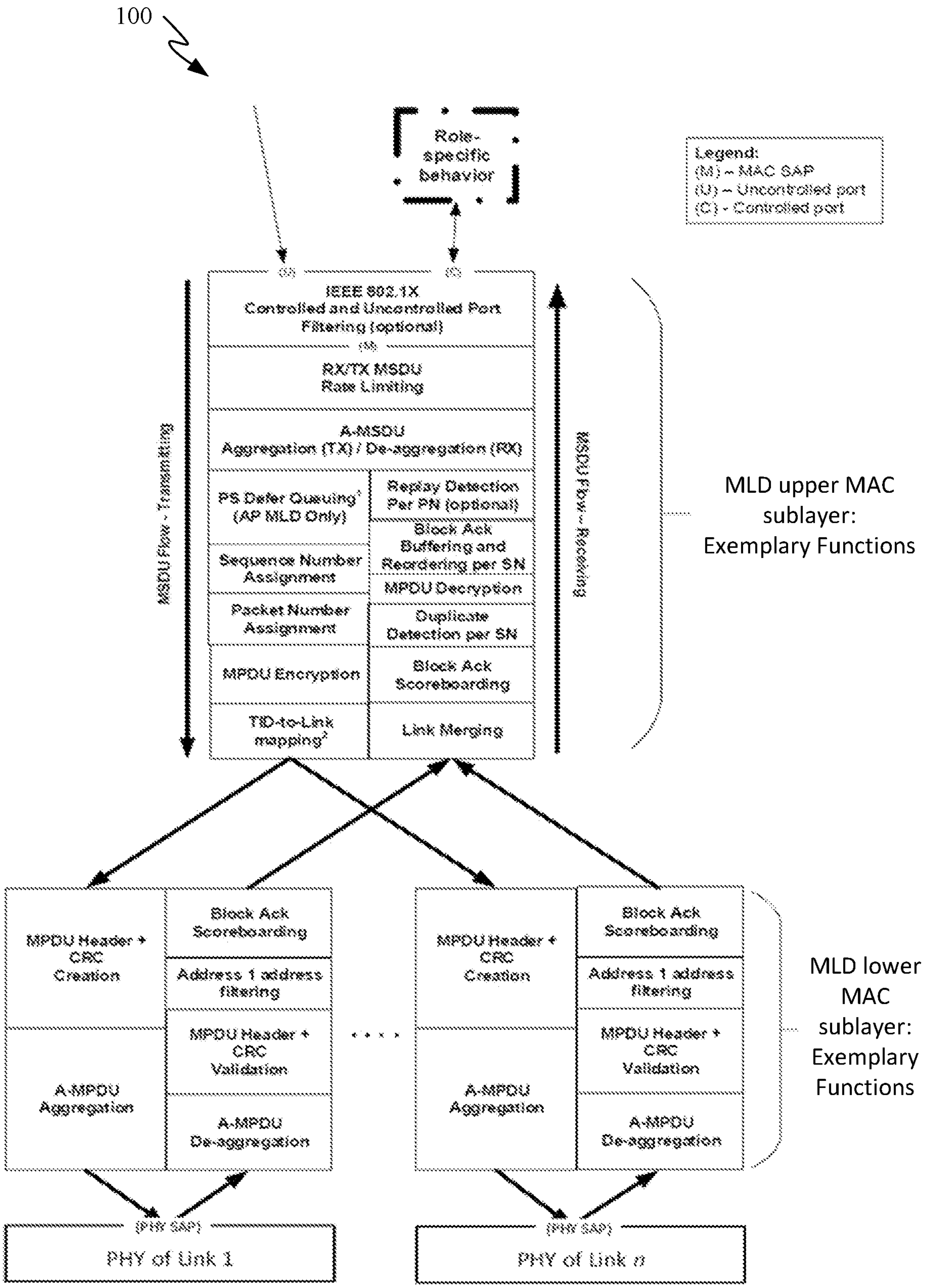
FIG. 1 illustrates a system architecture that may include an MLD model implemented at the point where a single traffic stream is multiplexed by an Upper MAC (UMAC) for processing by individual lower MACs.

Some advantage of the present disclosure may provide improvements to MLO and MLD, including increased throughput by channel aggregation, resulting in higher total bandwidth, additional robustness because of additional redundancy, and additional flexibility, and adaptability in allocating and prioritizing traffic FIG. 1 illustrates an example system architecture 100 for an MLD. Some of the MAC processing is common to all data packets (e.g., "Upper MAC processing"—UMAC) and does not perform specific functionalities tied to individual links. UMAC tasks may generally include combining smaller data packets into larger ones for efficient transmission and breaking down received large packets into smaller ones suitable for individual links. The UMAC also may generally assign unique sequence identifiers or numbers (e.g., a traffic identifier "TID") to data packets to ensure proper order during reassembly at the receiving end. Other MAC processing may be specific to the link the data is sent on (e.g., "lower MAC processing"—LMAC). FIG. 1 also illustrates how each link from 1 to n is associated with its own discrete physical layer (PHY) often taking the form of a discrete transmitter/receiver, which can be discrete hardware, or can be virtual hardware (e.g., a virtualized transmitter and/or receiver).

The current IEEE 802.11be standard revision defines MLD operation assuming all the links are wireless (802.11be, for example) and all links originate in the same device (and they all terminate in another single device). This may act as a constraint and expansion of the constraints may reduce limitations imposed by the current version of the 802.11be standard.

For example, some improvements to the basic MLD reference framework provided herein may include: (i) MLD with multiple wireless links, but with the LMAC(s) (and layers below) located in separate devices that can be in separate locations; (ii) MLD devices with multiple links, where some of the links are not wireless; and/or (iii) a combination of (i) and (ii), meaning that some or all of the LMACs can reside in separate devices and these non-collocated devices may use different PHY technologies. In some examples, a MLD may have a UMAC and multiple links (wireless and/or wired), but each LMAC(s) (and layers below) may be located in separate devices that can be in separate locations. Additionally, or alternatively, a MLD may have a UMAC and multiple links with at least one LMAC associated with a physical link of the MLD and another physical link of a second device.

FIG. 1 illustrates a system architecture 100 that may include an MLD model implemented at the point where a single traffic stream is multiplexed by the Upper MAC (UMAC) for processing by the individual lower MACs (LMAC). In some MLD implementations when the UMAC and LMAC are collocated, the interface between UMAC and LMAC may not explicitly defined (or standardized) since both blocks are collocated. Also, some implementations may not be required to follow the exact flow shown in FIG. 1, as long as the flow generates equivalent output at the interfaces that are defined by the 802.11 standard (e.g., MAC/PHY interface or PHY/Medium interface).

Non-Collocated LMAC (Split MAC) Architecture

To provide better coverage or a more seamless roaming experience, a system may include a single device containing the UMAC, connected to several distinct devices containing the separate LMACs. In some embodiments, this may build upon mesh topology, but with the whole mesh contained within the context of an MLD.

In a system where the UMAC and LMAC are not collocated, a communication protocol between the two blocks may be established. This communication protocol may run over whatever medium connects the UMAC and LMAC(s). This medium can be wireless (Wi-Fi, Bluetooth, etc.) or wired (coax, copper, fiber, optical, etc.).

Figure 2:
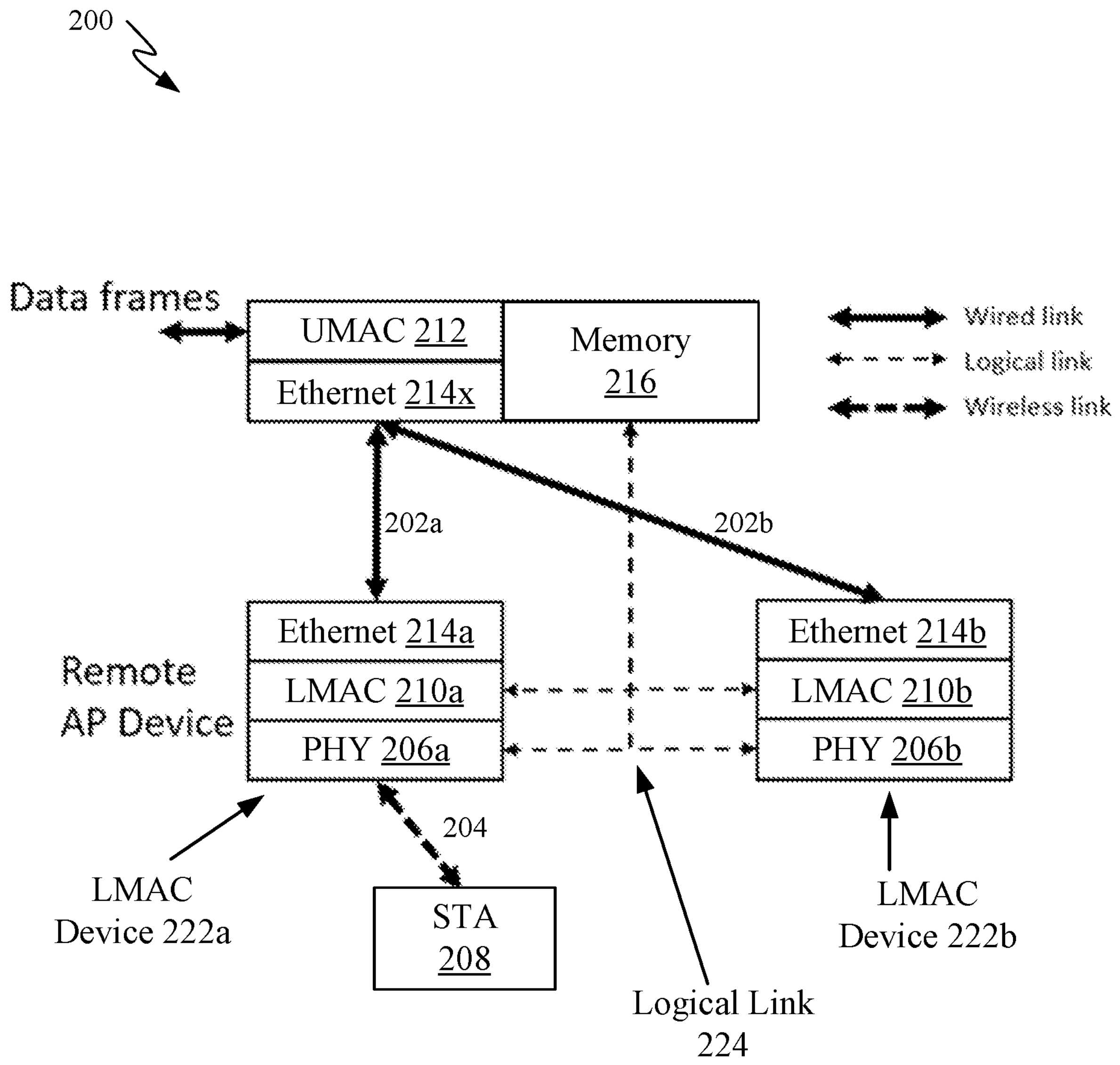
FIG. 2 illustrates a configuration in which the UMAC and LMACs are physically separated.

FIG. 2 illustrates a configuration in which the UMAC and LMACs are physically separated (e.g., not collocated). In this example configuration, the UMAC and LMACs are connected by wired links 202*a*, 202*b* that connect Ethernet terminal 214*x* of a UMAC device 220 and Ethernet terminals 214*a* and 214*b* the LMAC devices (e.g., remote AP devices 222*a*, 222*b*), however wireless links can also be used to connect the UMAC device 220 and the LMAC devices 222*a*, 222*b*. Alternatively, the wired connections can take the form of coaxial or fiber connections, or any other type of wired connection, such as power line communication (PLC). The UMAC device 220 can be coupled to the LMAC device 222*a*, 222*b* by a logical link 224, which may operate on the logical link control (LLC) layer to provide coordination between UMAC and LMACs and to allow concurrent data transmission and reception in multiple channels across a single or multiple frequency bands (e.g., 2.4 GHz, 5 GHz and 6 GHz).

When UMAC and LMAC are separated, there are several types of communication that may flow between them to maintain MLD operation:

1. Data packets. These data packets may be different from the MAC Protocol Data Units (MPDUs) that are defined in the 802.11 standard. One reason is that according to the conventional MLD operation, the actual MPDUs may be created by the LMAC and so with a non-collocated LMAC, the MPDUs may not be created in the same manner as with conventional MLD operation. The data format at UMAC/LMAC interface may be referred to as UMAC/LMAC frames.
2. Configuration data to configure the state of the LMAC and PHY. Since these two blocks are no longer collocated with the UMAC device (e.g., the "main device"), these messages also may be carried over the medium that connects the UMAC and LMAC, such as the links 202*a*, 202*b*, or the logical link 224.
3. Acknowledgments (ACK). Some networking standards or networking operations require a confirmation of reception of MPDUs between transmitter and receiver. In FIG. 2, a wireless link 204 is depicted between PHY 206 and STA 208. In some embodiments, PHY 206 can take the form of a Wi-Fi transceiver. In the case of separated UMAC/LMAC, the "LMAC device" (e.g., 222*a*, 222*b*) may be the one receiving the ACK. This ACK may be further propagated in some form from an LMAC 210 to a UMAC 212. In the case of not receiving the ACK, UMAC 212 may decide to retransmit in the same link or try another one with better channel conditions. While only two AP devices 222*a*, 222*b* are depicted in FIG. 2 it should be appreciated that 3, 4, 5 or more remote AP devices could be incorporated into the described architecture. Further, while the LMAC devices 222*a*, 222*b* are labeled as remote AP devices, the LMAC devices 222 need not be AP devices, and can instead be any type of device, including a repeater, a drone, a user device, a station, etc.
4. Control frames. These are non-data carrying Wi-Fi packets that may help with various aspects, e.g., medium reservation, . . . LMAC 210 may follow the lead of UMAC 212 on which frames to send and when.

In some embodiments, a single protocol may carry every type of packet/message that goes over the UMAC/LMAC interface, with an indication within this protocol identifying the nature and destination of the packet/message. Such an indication may be carried in a header that may be read by a receiving device. Upon reception, the receiving UMAC 212 or LMAC 210 may decapsulate the communication and route it to the correct functional block for further processing. In embodiments where the single protocol is transmitted wirelessly, the transmission may be purposefully formatted and/or encrypted to prevent unintentional interception by other conventional wireless devices by way of frequency transmission and/or protocol.

As mentioned above, some implementations may not be required to follow a standardized MLD system. Certain implementations that are optimized for performance may choose to organize the transmission and reception flow differently. For instance, some or all actual bit processing of the data could be postponed till the moment an MPDU or an aggregate MPDU (A-MPDU) is created (last step in the system architecture 100 of in FIG. 1). Before that, identification of packets could be done by reference. At the last moment are these packets retrieved from memory and is all necessary bit processing (e.g., encryption) performed. In such a system, the standardized model may not be strictly followed and there may be no actual packets exchanged between UMAC and LMAC.

In some embodiments, an MLD architecture in which the UMAC and LMAC devices are not collocated could also include a feature in which collocated operation is possible, whether there is full collocation or partial collocation. For example, the UMAC and LMAC devices can include one or more mounting points allowing for the establishment of electrically conductive pathways that allow for the operation of the MLD architecture in a manner closer to the existing 802.11be standard.

To accommodate such an implementation, some example implementations may include:

1. An architecture where all LMAC devices have access to a common memory 216 and the UMAC/LMAC interface exchanges not bit-based packets, but packet references to one or more memory locations. The individual LMACs can then access the actual packets in the memory 216 and perform the necessary processing to create the A-MPDUs. This directly extends the architecture described above to non-collocated MLO.
2. An architecture to maintain any existing optimized, but have a hardware engine that can be configured to produce either an A-MPDU or a stream of UMAC/LMAC frames, or a combination of A-MPDU and UMAC/LMAC frames. Given the similarity between the two types of operation, reuse should be possible, allowing for efficient implementation of such a multi-mode hardware block.

Heterogeneous Architecture

In many deployments, the wireless medium may not be the only medium over which data can be shared. Some or all advantages of MLO (aggregation, robustness, adaptability, . . . ) may be extended by considering multiplexing traffic over all available media, instead of just over multiple Wi-Fi channels. The links could also be non-WiFi wireless links (e.g., cellular, 5G, mmWave, Bluetooth, etc.).

Some embodiments may include a multi-link device where one or more of the links are non-wireless or non-WiFi. This may be implemented in a way that is transparent to the UMAC. The UMAC may communicate over the UMAC/LMAC interface, without necessarily being aware of the heterogeneous nature of some of the links. This may require the non-wireless or non-WiFi links to emulate the behavior of a wireless LMAC towards the UMAC (in both transmit (Tx) and receive (Rx) directions). Several architectures can be considered including using virtualization, including (a) an UMAC/LMAC adapter (as further described in conjunction with FIG. 3), or (b) a STA emulator (as further described in conjunction with FIG. 4). The UMAC/LMAC adapter may be a separate device configured to function as a bridge or interface between the UMAC and LMAC. The STA emulator may be a virtualized STA, for example.

Figure 3:
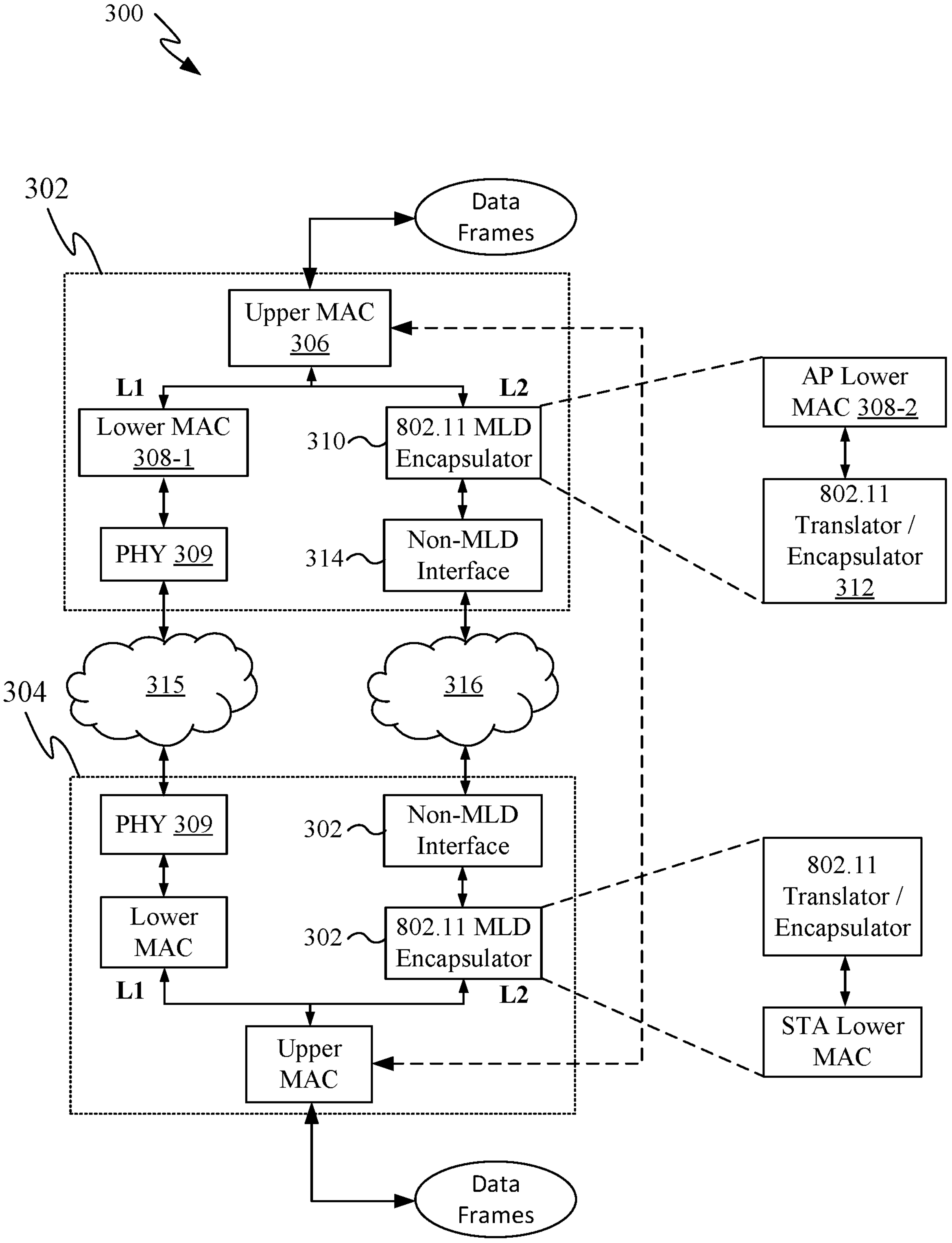
FIG. 3 illustrates an example architecture that includes an access point device and a repeater device.

FIG. 3 illustrates an example architecture 300, which includes an access point device 302 and a repeater device 304. Access point device 302 and repeater device 304 each are depicted with two links through which data may be received and/or transmitted (designated as L1 and L2), however it should be appreciated that three or more links are also possible and deemed to be within the scope of this disclosure.

Access point device 302 includes an Upper MAC (UMAC) 306, a first Lower MAC (LMAC) 308-1 and a second LMAC 308-2 incorporated into an 802.11 MLD Encapsulator 310. LMAC 308-1 forms part of the L1 link in conjunction with PHY 309, which can take the form of a Wi-Fi transceiver that communicates to another Wi-Fi transceiver in device 304 across a Wi-Fi network 315. Access point device 302 also includes an L2 link that includes 802.11 MLD Encapsulator 310 having an 802.11 Translator/Encapsulator 312 that is configured to receive information not following protocols normally used with an LMAC and to convert the information into a format actionable by AP LMAC 308. The 802.11 MLD Encapsulator 310 includes an interface block labeled Translator/Encapsulator 312 that translates packets coming over the UMAC/LMAC interface to a format that can be handled by a non-MLD interface 314 (i.e., a non-WiFi link). The Translator/Encapsulator 312 may function as a UMAC/LMAC adapter, for example. The non-WiFi interface can be at PHY level, MAC level or above. The non-WiFi medium 316 connects the non-WiFi devices. At a receiver side of repeater device 304, the output of the non-WiFi interface is again converted into a format that can be processed by UMAC. A non-MLD or non-Wi-Fi interface can include any type of device or interface, including cellular, Ethernet, fiber and coaxial communication interfaces.

Figure 4:
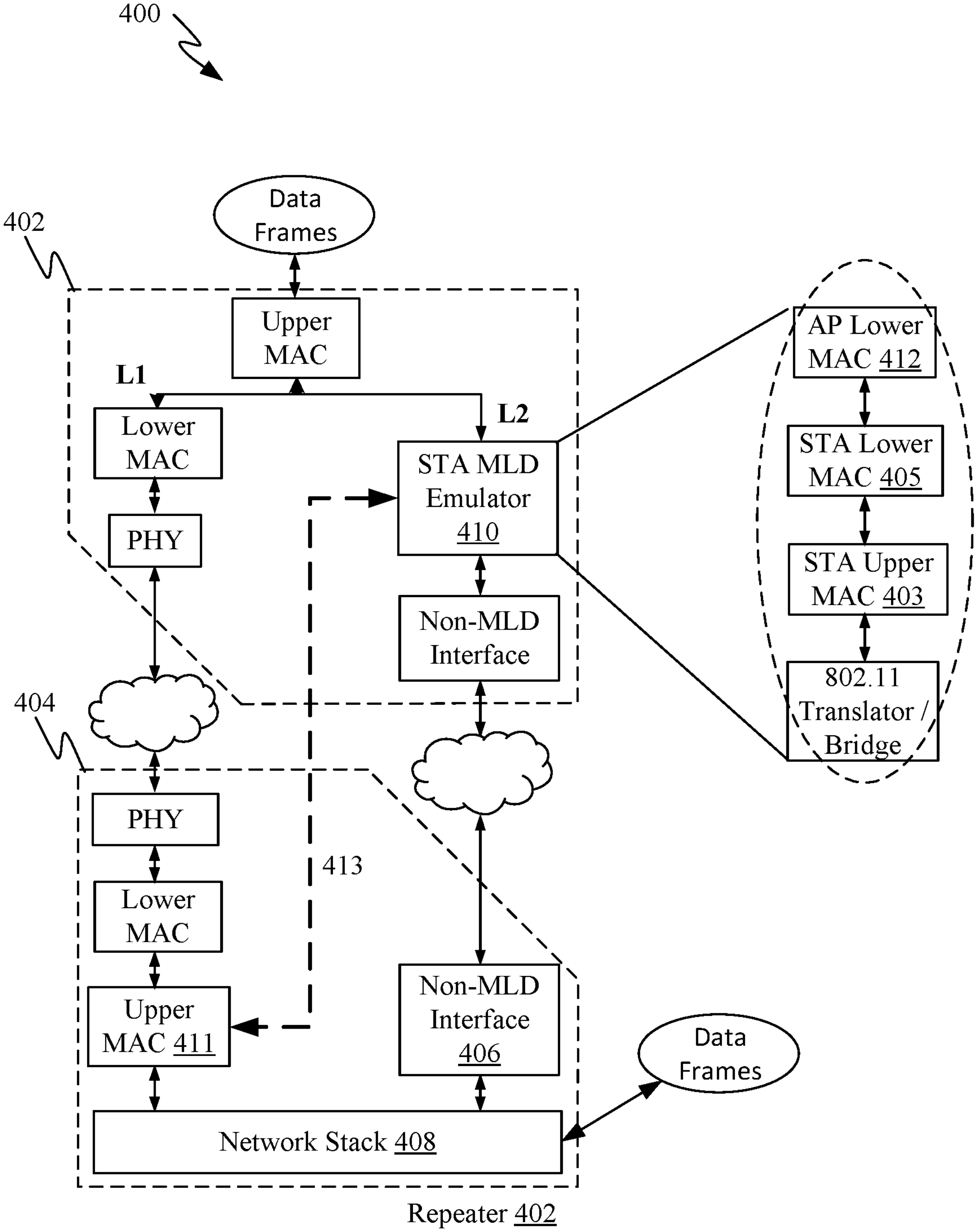
FIG. 4 illustrates another example architecture that includes a STA emulator.

FIG. 4 illustrates another example architecture 400 that includes a STA emulator 410. As with the previous embodiments, the L1 link of an AP MLD 402 can be a conventional MLD link transmitting data over Wi-Fi. In this embodiment, a STA affiliated with a STA MLD 404 is collocated with the AP MLD 402 and acts as a relay towards the heterogeneous device, AP MLD 402. The STA collocated with AP MLD 402 includes STA UMAC 403 and STA LMAC 405. In particular, the STA collocated with AP MLD 402 is part of STA MLD Emulator 410. STA MLD emulator 410 can be linked with upper MAC 411 of STA MLD 404 by wave of wired or wireless connection 413. This configuration combines the flexibility of the non-collocated UMAC and LMAC architecture with the heterogeneous MLDs.

The STA MLD is configured to operate a non-MLD interface (non-WiFi link) 406 managed by an upper layer network stack 408, not directly part of STA MLD 404. While the AP MLD 402 maintains a native affiliated AP (see AP lower MAC 412), it internally creates a STA MLD emulator for managing the non-WiFi interface from the AP MLD. The STA MLD emulator 410 implements the complete logic so that the AP MLD sees another affiliated AP associated with a virtual remote STA MLD. From AP MLD 402 perspective, it sees two MLD links, one of them is physically based on a non-WiFi link, but for AP MLD 402 the non-WiFi link appears and can be managed as a WiFi link. The traffic aggregation in this case is done at a higher layer.

Figure 5:
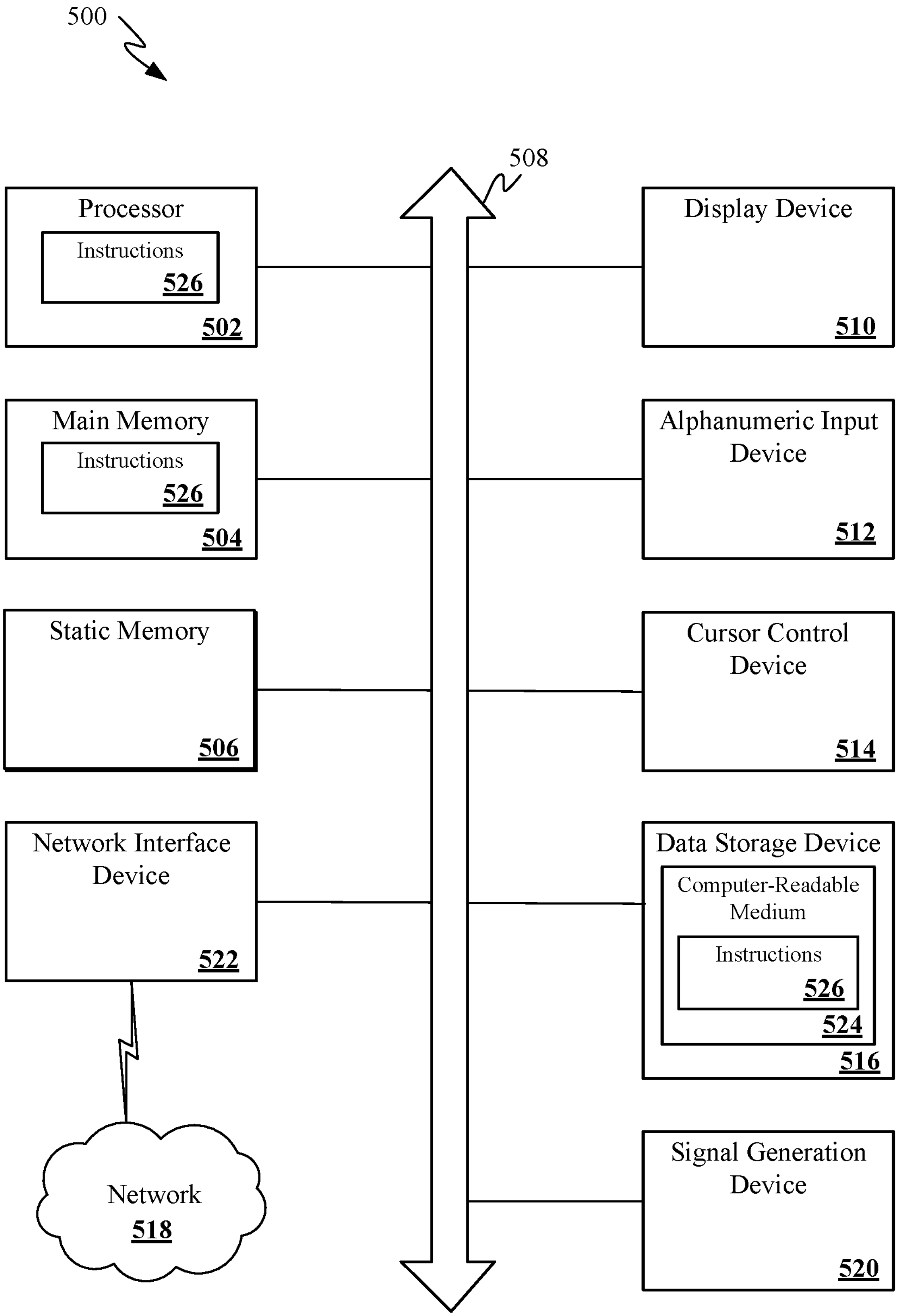
FIG. 5 illustrates a diagrammatic representation of a machine in the example form of a computing device within which a set of instructions, for causing the machine to perform any one or more of the operations discussed herein, may be executed.

FIG. 5 illustrates a diagrammatic representation of a machine in the example form of a computing device 500 within which a set of instructions, for causing the machine to perform any one or more of the operations discussed herein, may be executed. The computing device 500 may include a rackmount server, a router computer, a server computer, a mainframe computer, a laptop computer, a tablet computer, a desktop computer, or any computing device with at least one processor, etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. Further, while only a single machine is illustrated, the term "machine" may also include any collection of machines that individually or jointly execute a set (or multiple sets) of instructions to perform any one or more of the methods discussed herein.

The example computing device 500 includes a processing device (e.g., a processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)) and a data storage device 516, which communicate with each other via a bus 508.

Processing device 502 represents one or more processing devices such as a microprocessor, central processing unit, or the like. More particularly, the processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also include one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computing device 500 may further include a network interface device 522 which may communicate with a network 518. The computing device 500 also may include a display device 510 (e.g., a liquid crystal display (LCD) or a cathode ray tube (CRT)), an alphanumeric input device 512 (e.g., a keyboard), a cursor control device 514 (e.g., a mouse) and a signal generation device 520 (e.g., a speaker). In at least one embodiment, the display device 510, the alphanumeric input device 512, and the cursor control device 514 may be combined into a single component or device (e.g., an LCD touch screen).

The data storage device 516 may include a computer-readable storage medium 524 on which is stored one or more sets of instructions 526 embodying any one or more of the methods or functions described herein. The instructions 526 may also reside, completely or at least partially, within the main memory 504 and/or within the processing device 502 during execution thereof by the computing device 500, the main memory 504 and the processing device 502 also constituting computer-readable media. The instructions may further be transmitted or received over a network 518 via the network interface device 522.

While the computer-readable storage medium 526 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Figure 6:
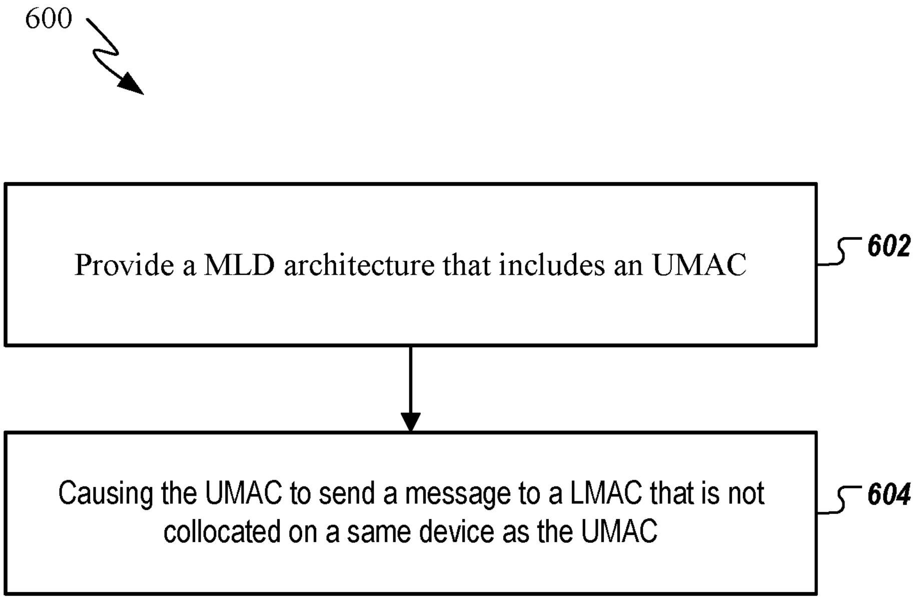
FIG. 6 illustrates a flowchart of an example method of providing MLD operation.

FIG. 6 illustrates a flowchart of an example method 600 of MLD operation, in accordance with at least one embodiment of the present disclosure. The method 600 may be performed by processing logic that may include hardware (circuitry, dedicated logic, etc.), software (such as is run on a computer system or a dedicated machine), or a combination of both, which processing logic may be included in any computer system or device such as any of the devices of FIGS. 1-5.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification may be capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

At block 602, processing logic may provide a multi-link device (MLD) architecture that includes an Upper media access control (UMAC) layer.

At block 604, the processing logic may cause the UMAC to send a message to a Lower media access control (LMAC) that is not collocated on a same device as the UMAC.

Another example method may include providing multiple LMAC devices physically separated from each other and from a UMAC device, where the UMAC device and the multiple LMAC devices have access to a common memory.

Another example method may include providing a MLD architecture that includes an UMAC layer. The method may include sending a message from the UMAC to a first LMAC and to a second LMAC. The first LMAC may be collocated with the UMAC and the second LMAC may be located on a different device than the UMAC.

Another example method may include providing a MLD architecture that includes an UMAC layer. The method may include sending a message from the UMAC to a MLD encapsulator. The MLD encapsulator may include an AP LMAC and a Translator/Encapsulator. The MLD encapsulator may be communicatively coupled to a non MLD device via a non-MLD interface. The non-MLD device may have the same or similar MLD encapsulator so as to receive, decode, translate, etc. the message from the UMAC before the message reaches the non-MLD device UMAC. In this manner, a non-MLD device may be used as a MLD device.

Another example method may include providing a MLD architecture that includes an UMAC layer. The method may include sending a message from the UMAC to a STA MLD emulator. The STA MLD emulator may include one or more of an AP LMAC, a STA LMAC, STA UMAC, and a translator bridge. The STA MLD emulator may either be collocated with the UMAC or not collocated with the UMAC. The STA UMAC may also be linked and communicatively coupled to a physical STA device, such as via a STA UMAC that resides on the physical STA device. The STA UMAC that resides on the physical STA device may share a memory space with the STA UMAC that is associated with the STA MLD emulator.

Another example method may include providing a MLD architecture for a non-MLD device that includes an UMAC layer. The method may include receiving a message at a LMAC that includes a Translator/Encapsulator to translate the message in a manner that can be processed by the UMAC layer. The translated message is passed to the UMAC layer for further processing.

Another example method may include providing a MLD architecture that includes an UMAC layer. The method may include receiving a message from the UMAC via a LMAC that is not collocated with the UMAC.

Modifications, additions, or omissions may be made to the methods without departing from the scope of the present disclosure. In another example, the designations of different elements in the manner described is meant to help explain concepts described herein and is not limiting. Further, the methods may include any number of other elements or may be implemented within other systems or contexts than those described.

A number of implementations have been described. Nevertheless, it will be understood that various modifications may be made without departing from the spirit and scope of the disclosure. Accordingly, other implementations are within the scope of the following claims.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A multi-link device (MLD) architecture, comprising
a common memory;
an Upper media access control (UMAC) device; and
a plurality of Lower media access control (LMAC) devices physically separated from each other and from the UMAC device, wherein the UMAC device and the plurality of LMAC devices have access to the common memory,
wherein communications between the UMAC device and the plurality of LMAC devices include UMAC/LMAC frames that contain packet references.

2. The MLD architecture of claim 1, wherein the UMAC and LMAC devices are connected by a wireless or a wired/optical medium.

3. The MLD architecture of claim 1, wherein the MLD architecture is multi-modal and configured to output only bit-based packets when the UMAC device and the plurality of LMAC devices are collocated.

4. The MLD architecture of claim 3, wherein the UMAC device and the plurality of LMAC devices each comprise connectors for attaching the UMAC and LMAC devices together.

5. The MLD architecture of claim 1, wherein the UMAC is a first UMAC and the plurality of LMACs are a first plurality of LMACs, wherein the first UMAC and the first plurality of LMACs are associated with an access point MLD, and wherein the MLD architecture further comprises a STA MLD device comprising a second UMAC and a second plurality of LMACs in communication with the second UMAC.

6. The MLD architecture of claim 5, wherein a first LMAC of the second plurality of LMACs manages a non-WiFi link in communication with the access point MLD.

7. The MLD architecture of claim 6, wherein a second LMAC of the second plurality of LMACs manages a WiFi link in communication with the access point MLD.

8. A multi-link device (MLD) architecture, comprising:
an Upper media access control (UMAC); and a plurality of Lower media access control (LMAC) in communication with the UMAC, the plurality of LMACs comprising:

a first LMAC configured to manage a Wi-Fi transceiver; and a second LMAC configured to manage a non-Wi-Fi link, wherein the UMAC is configured to communicate with at least one LMAC over a wired connection using packet references.

9. The MLD architecture of claim 8, wherein the non-Wi-Fi link is a cellular link.

10. The MLD architecture of claim 9, wherein the UMAC is not collocated with the plurality of LMACs.

11. The MLD architecture of claim 8, wherein the second LMAC is contained within an emulator that includes a STA MLD emulator.

12. The MLD architecture of claim 11, wherein traffic on a link is directed to the STA MLD emulator, which acts as a virtual STA device configured to provide a bridge for the non-WiFi link.

13. The MLD architecture of claim 8, wherein the non-WiFi link is an Ethernet link.

14. The MLD architecture of claim 8, wherein the plurality of LMACs comprises at least three LMACs.

15. A method, comprising:

providing a multi-link device (MLD) architecture, comprising an Upper media access control (UMAC) layer;

causing the UMAC to send a message to a Lower media access control (LMAC) that is not collocated on a same device as the UMAC, wherein the message is provided from the UMAC to the LMAC via an encapsulator or a station (STA) emulator.

16. The method of claim 15, wherein the LMAC is associated with a non-MLD device.

* * * * *